US012811162B2

(12) United States Patent
Huang et al.

(10) Patent No.: US 12,811,162 B2
(45) Date of Patent: Nov. 24, 2026

(54) METHOD FOR PREPARING MODIFIED PLATINUM-BASED CATALYST FOR FUEL CELL BY REGENERATION OF PLATINUM-RHENIUM SPENT CATALYST, CATALYSTS AND HYDROGEN FUEL CELL

(71) Applicant: CHINA UNIVERSITY OF PETROLEUM-BEIJING, Beijing (CN)

(72) Inventors: Guoyong Huang, Beijing (CN); Jiawei Wen, Beijing (CN); Maolin Tian, Beijing (CN); Jian Cui, Beijing (CN); Xueli Wang, Beijing (CN); Wenjie Zhang, Beijing (CN); Mingshuai Wu, Beijing (CN); Tongjun Shen, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 525 days.

(21) Appl. No.: 18/496,198

(22) Filed: Oct. 27, 2023

(65) Prior Publication Data

US 2024/0413353 A1 Dec. 12, 2024

(30) Foreign Application Priority Data

Jun. 9, 2023 (CN) ......................... 202310686724.5

(51) Int. Cl.

*H01M 4/92* (2006.01)
*C22B 11/00* (2006.01)
*H01M 4/88* (2006.01)

(52) U.S. Cl.

CPC ........... *H01M 4/926* (2013.01); *C22B 11/048* (2013.01); *H01M 4/921* (2013.01); *H01M 4/88* (2013.01)

(58) Field of Classification Search

CPC ........ H01M 4/926; H01M 4/88; H01M 4/921; C22B 11/048

See application file for complete search history.

(56) References Cited

U.S. PATENT DOCUMENTS 3,672,874 A * 6/1972 Wiley ...................... B01J 23/96 423/52
4,557,906 A * 12/1985 Douglas ............... C01G 47/003 423/49

FOREIGN PATENT DOCUMENTS

CN 101380597 B 4/2011
CN 102936658 A * 2/2013

(Continued)

OTHER PUBLICATIONS

T. N. Angelidis, D. Rosopoulou, V. Tzitzios, "Selective Rhenium Recovery from Spent Reforming Catalysts", Apr. 3, 1999, ACS Publications, vol. 38, 1830-1836 (Year: 1999).*

*Primary Examiner* — Benjamin A Schiffman
*Assistant Examiner* — David Andrew Calderon
(74) *Attorney, Agent, or Firm* — HAUPTMAN HAM, LLP

(57) ABSTRACT

A method includes 1) removal oil from aluminum-based platinum rhenium-containing spent catalysts; 2) mixing the spent catalyst and sodium hydroxide powder and heating in an oxygen-free environment to obtain a clinker; 3) leaching the clinker in a weakly alkaline aqueous solution to obtain a first leach solution containing the elements Al and Re and a first leach residue containing Pt and Re; 4) converting the first leaching solution into a sodium meta-aluminate solution and a sodium perrhenate solution; 5) adding an aqueous solution of an acidic reagent and an aqueous solution of an oxidizing reagent to the first leaching residue for oxidizing acid leaching to obtain a second leaching solution containing precursors including platinum and rhenium; 6) reducing and (Continued)

loading the precursors on a carbon carrier to obtain the modified platinum based catalyst for fuel cell. The method enables the recovery of Re and Al elements from spent catalysts.

8 Claims, 3 Drawing Sheets

(56) References Cited

FOREIGN PATENT DOCUMENTS

| | | | | | |
|---|---|---|---|---|---|
| CN | 107190147 | A | | 9/2017 | |
| CN | 108277350 | A | * | 7/2018 | ............ C22B 61/00 |
| CN | 109126777 | A | | 1/2019 | |
| CN | 108913919 | B | | 3/2022 | |
| CN | 114522699 | A | | 5/2022 | |
| JP | 2006130387 | A | * | 5/2006 | |
| RU | 2421532 | C1 | * | 6/2011 | |

* cited by examiner

METHOD FOR PREPARING MODIFIED PLATINUM-BASED CATALYST FOR FUEL CELL BY REGENERATION OF PLATINUM-RHENIUM SPENT CATALYST, CATALYSTS AND HYDROGEN FUEL CELL

RELATED APPLICATIONS

The present application claims priority from Chinese Application Number 202310686724.5, filed Jun. 9, 2023, the disclosure of which is hereby incorporated by reference herein in its entirety.

FIELD OF THE INVENTION

The present invention relates to the field of catalyst technology, specifically to a method for preparing modified platinum-based catalyst for fuel cell by recovering metal regeneration from platinum-rhenium-containing spent catalyst.

BACKGROUND OF THE INVENTION

Catalytic reforming is an important tool for improving gasoline quality and producing petrochemical raw materials. The metal component of catalytic reforming catalysts is mainly Pt and the carrier is $Al_2O_3$. With the need of industrial development, platinum-rhenium bimetallic catalysts are popular for catalytic reforming, which improves the depth of reforming reaction, increases the yield of gasoline, aromatics and hydrogen, etc., and brings catalytic reforming technology to a new level. In 2020, China's petrochemical catalyst consumption amounted to 412,000 tons, of which the use amounts of platinum and rhenium were 5.5 tons and 4.3 tons respectively. Catalysts will be inactivated for a period of time due to carbon accumulation, active metal sintering, catalyst poisoning and other factors. End-of-life deactivated spent catalysts are environmentally hazardous and are classified as HW50 type hazardous waste in the National Hazardous Waste List by the Ministry of Ecology and Environment of China. In 2020, the amounts of platinum and rhenium in China's spent petrochemical catalysts are 1.5 tons and 2.0 tons respectively. The spent catalysts are a large "urban mine" with high utilization value. Therefore, it is of great environmental significance and economic value to treat the spent catalysts in a "reduced, harmless and resourceful" way, which is also in line with the development concept of building a resource-saving and environment-friendly society in China.

fuel cells is a chemical device that converts the chemical energy of fuel into electricity directly, and under the background of "dual carbon" development goals, the development space of hydrogen energy industry is broad. Among them, hydrogen fuel cell has become an ideal power cell for electric vehicles because of its advantages of no pollution, no noise and high efficiency. As an important component, catalysts for hydrogen fuel cells are mainly Pt/C catalysts, and the cost of catalysts accounts for 36% of the cost of the power stack. Platinum has stable physicochemical properties and good catalytic performance, and is widely used in the field of catalysis, but it is expensive and China's reserves are very low and mainly rely on imports. The rare metal in platinum-rhenium spent catalyst has higher grade than ore, and can be used as the active metal in fuel cell catalysts after recovery and applied in hydrogen fuel cells, which can reduce the production cost, increase the supply of platinum resources, reduce foreign dependence, and realize the value-added utilization of hazardous spent, which has great use value.

Chinese patent CN101380597B discloses a method for removing oil from a petrochemical spent catalyst, proposing to add 0.5-1.0% by weight of a water-soluble polymer dispersant to an oil-containing spent catalyst and distill it at a pressure of $1.5\text{-}6.0\times10^4$ Pa and a temperature of 300-600 °C to remove the oil. This method involves the interaction between the aqueous polymer dispersant solution and the oil in the petrochemical spent catalyst under the action of high temperature and pressure, which leads to the oil desorbing from the catalyst surface.

Chinese patent CN114522699A discloses a method for removing oil from the surface of a spent refinery catalyst, in which the ground spent refinery catalyst is mixed with a hydrogen peroxide solution of a concentration of 5-15 wt % or a 50-100 mmol/L persulfate solution, and solid-liquid separation is carried out after the reaction to obtain the de-oiled catalyst. This method removes the oil attached to the spent catalyst by oxidizing and decomposing the oil through the Fenton effect of hydrogen peroxide and persulfate. However, the introduction of the strong oxidizing agent and the process of oil removal produces sewage, can cause certain environmental hazards.

Chinese patent CN107190147A discloses oxidizing and roasting of a platinum-containing spent catalyst to remove carbon and organic matters, followed by oxidizing and leaching of platinum using an inorganic acid, followed by adsorption through a R410 resin column to enrich and purify the platinum, and reduction to obtain sponge platinum products. This method is a typical hydrometallurgical process for oil removal from spent catalysts and recovery of precious metals with a high recovery rate, but the roasting process generates harmful exhaust gases, and the acid leaching process uses a large amount of acid and generates a large amount of waste water.

Chinese patent CN108913919B discloses a method for extracting rhenium from a failed platinum-rhenium catalyst. This method extracts rhenium by high pressure acid leaching of the spent catalyst containing platinum and rhenium, anionic resin exchange and other methods to obtain ammonium rhenate, etc. This method has a high recovery rate of rhenium and high purity of the recovered product. However, this method does not treat the carrier and active metal platinum, and the recovered metal is not used in high value.

Chinese patent CN109126777A discloses a method for preparing Pt/C catalyst from a Pt-containing spent catalyst, which also belongs to the field of precious metal recycling technology. The platinum-containing spent catalyst is roasted, oxidized and filtered to obtain a crude chloroplatinic acid solution, then extracted and reverse extracted to obtain sodium chloroplatinic acid solution, and finally mixed with carbon black carrier for reduction, filtration and drying to obtain a Pt/C catalyst. The Pt/C catalyst prepared by this method has a low active metal loading and does not achieve full component recovery of metal components such as the carrier.

In the above patents, the inventions of oil removal pretreatment process in spent catalysts are to achieve oil removal by the interaction between the oil attached to petrochemical spent catalyst and the oil removal agent, avoiding the problems of thermal runaway and exhaust gas generation caused by direct roasting for oil removal. However, the experimental conditions of the oil removal process are harsh, and a large amount of waste water is easily generated. Among the above patents, the inventions for the recovery of rare precious metal from spent catalyst mainly achieve the recovery of platinum group metals through processes such as acid leaching-ion exchange. The oxidation acid leaching process has a high leaching rate, and ion exchange can selectively adsorb and separate precious metal components, and the process is also known as a common wet recovery method in industry. However, the process generates a large amount of waste water, some of the dissolved carriers are difficult to separate, and the recovered precious metal products are not further realized for high value utilization.

SUMMARY OF THE INVENTION

The purpose of the present invention is to provide a method for preparing modified platinum-based catalyst for fuel cells by regeneration of platinum rhenium spent catalyst, a catalyst and a hydrogen fuel cells, The method can realize spent catalyst oil removal pre-treatment and valuable metal recovery, and prepare the regenerated catalyst and use it in fuel cells, and realize harmless and reduce resource treatment of hazardous waste. The invention has the advantages of simple process, low cost and environmental protection, and the regenerated prepared catalyst has stable performance and high catalytic activity.

The present invention provides a method for preparing modified platinum-based catalyst for fuel cells by regeneration of platinum rhenium spent catalyst, comprising the steps of:

(1) removal oil from an aluminum-based platinum rhenium-containing spent catalyst to obtain a de-oiled spent catalyst;

(2) mixing the de-oiled spent catalyst treated in step (1) with sodium hydroxide powder and heat treating it in an oxygen-free environment to obtain a clinker;

(3) leaching the clinker in a weakly alkaline aqueous solution to obtain a first leach solution containing the elements Al and Re and a first leach residue containing Pt and a small portion of Re;

(4) converting the first leaching solution into a sodium meta-aluminate solution and a sodium perrhenate solution;

(5) adding an aqueous solution of an acidic reagent and an aqueous solution of an oxidizing reagent to the first leaching residue for oxidative acid leaching to obtain a second leaching solution containing precursors of platinum and rhenium elements (6) reducing and loading the precursors containing platinum and rhenium elements in the second leaching solution on a carbon carrier to obtain a rhenium-doped Pt/C catalyst to obtain the modified platinum-based catalyst for fuel cells.

In the above method for preparing modified platinum-based catalyst for fuel cell by regeneration of platinum rhenium spent catalyst, the platinum-rhenium containing spent catalyst contains 95 to 97% by mass of alumina, such as 95%, 95.8%, 97%;

the platinum-rhenium containing spent catalyst has a mass percentage content of the active metal component platinum of 0.2 to 0.3%, such as 0.22%, 0.24%, 0.25%;

the platinum-rhenium containing spent catalyst has a mass percent content of the active metal component rhenium of 0.4 to 0.5%, such as 0.43%, 0.45%;

the step of removing oil in step (1) is as follows: grinding the platinum-rhenium-containing spent catalyst to powder form, adding a complex surfactant solution for cleaning under an ultrasonic condition to obtain the de-oiled spent catalyst;

the powdered platinum rhenium spent catalyst has a particle size of 100 to 200 mesh, specifically 100 mesh, and in specific embodiments of the present invention the powdered platinum rhenium spent catalyst is prepared by ball milling at a speed of 500 r/min for 5 h;

the complex surfactant is prepared by mixing a nonionic surfactant and an anionic surfactant;

the nonionic surfactant is selected from any one of fatty alcohol polyoxyethylene ether (AEO-3), Triton X-100 (TX-100) and glucoside (APG1214);

the anionic surfactant is selected from any one of sodium dodecylbenzene sulfonate (SDBS), sodium fatty alcohol ethoxylate sulfate (AES) and sodium dodecyl sulfonate (SLS);

the nonionic surfactant and the anionic surfactant are in a mass ratio of (1 to 4):1, such as 1:1, 2:1, 3:1, or 4:1;

the aqueous solution of the complex surfactant has a concentration of 100 to 1000 mg/L, specifically 100 to 900 mg/L, such as 100 mg/L, 400 mg/L, 500 mg/L, 600 mg/L, 800 mg/L, or 900 mg/L;

a ratio of a mass of the platinum-rhenium containing spent catalyst to a volume of the aqueous solution of the surfactant is 1 g:(10 to 100) mL, preferably 1 g:(10 to 60) mL, specifically 1 g: 10 mL, 1 g: 20 mL, 1 g: 30 mL, 1 g: 40 mL, 1 g: 50 mL, or 1 g: 60 mL;

the ultrasonic condition has a power of 100~500 W (e.g., 200-500 W, 200 W, 300 W or 500 W), a cleaning temperature of 25-60 °C. (e.g., 40-50 °C, 40 °C or 50 °C) and a cleaning time of 1-4 h (e.g., 1 h, 2 h or 4 h);

preferably, the specific conditions are as follows: the complex surfactant consists of a solution of SDBS and APG1214 with a mass ratio of 1:2 and a concentration of 800 mg/L; the ratio of the mass of the platinum-rhenium-containing spent catalyst to the volume of the aqueous solution of the surfactant is 1 g: 60 mL, the power of the ultrasonic condition is 200 W, and the cleaning time is 1 h.

In the present invention, the action principle of the pre-treatment in step (1) is as follows. The oil-containing spent catalyst is cleaned under ultrasonic environment by the surfactant solution, the surfactant can significantly reduce the oil-water interfacial tension, so that the oil droplets are dispersed into small droplets dissolved in the surfactant micelles; and the cavitation effect of ultrasound can increase the mobility of oil, further realizing the spent catalyst oil removal.

In the above method for preparing modified platinum-based catalyst for fuel cells by regeneration of platinum rhenium spent catalyst, in step (2), the mass ratio of the spent catalyst treated by step (1) and the sodium hydroxide powder is 1:(0.8 to 1.6), specifically 1:(1 to 1.4), 1:1.2, 1:1.4 or 1:1;

the oxygen-free environment is under an inert gas protection, such as nitrogen and/or argon;

the heat treatment is at a temperature of 300 to 600 °C, specifically 300 °C, 500 °C, 600 °C or 400 °C, for a time of 1 to 5 h, specifically 2 h, 1 h, 3 h or 5 h.

In the present invention, the action principle of step (2) oxygen-free sodium heat treatment is as follows. The carrier in the spent catalyst is alumina, which is able to react with sodium hydroxide at a high temperature to generate sodium meta-aluminate as a by-product. The active metal rhenium exists in the form of elementary substance and oxides. The active metal rhenium exists in the form of monomers and oxides. Heat treatment of rhenium metal under aerobic conditions reacts to form Re2O7, which is volatile and causes loss of quality. When sodium heat treatment is carried out, rhenium and its oxides can react to produce sodium perrhenate as a by-product. During sodium heat treatment, the active metal Pt does not react.

In the above method for preparing modified platinum-based catalyst for fuel cells by regeneration of platinum rhenium spent catalyst, in step (3), the weakly alkaline aqueous solution has a pH of 7.1 to 8.9, such as 8 to 8.5, 8.5, 8.0 or 7.5;

the solute in the weakly alkaline aqueous solution is sodium hydroxide, sodium carbonate or sodium bicarbonate;

the mass of the clinker to the volume of the weakly alkaline aqueous solution is in a ratio of 1 g:(10 to 20) mL, specifically 1 g: 10 mL;

the leaching is carried out under a stirring condition, at a leaching temperature of 25-60 °C. (e.g., 40-50 °C, 40 °C, 50 °C) for a leaching time of 10-60 min (e.g., 20-40 min, 30 min, 40 min or 20 min).

In the present invention, the action principle of the weak alkaline leaching in step (3) works is as follows. The clinker obtained in step (2) is leached, and the roasted clinker comprises sodium meta-aluminate as the main component and a small amount of sodium perrhenate. Sodium meta-aluminate and perrhenate enter the liquid phase and platinum is used as the residue phase. The weakly alkaline environment can inhibit the hydrolysis of sodium meta-aluminate and improve the yield of sodium meta-aluminate by-product.

In the above method for preparing modified platinum-based catalyst for fuel cells by regeneration of platinum rhenium spent catalyst, in step (4), the step of converting the first leaching solution into the sodium meta-aluminate solution and the sodium perrhenate solution is as follows: passing the first leaching solution into an exchange column equipped with an imprinting resin capable of selectively adsorbing a rhenium-containing anion group and collecting the exchange tailing solution; obtaining the sodium meta-aluminate solution and, when the adsorption is finished, passing the desorption solution into the resin for desorption to obtain the sodium perrhenate solution;

preferably, the imprinting resin is an ion-imprinted resin containing a polystyrene group;

preferably, the volume ratio of the first leaching solution to the imprinting resin is (5 to 10):1 (e.g., 10:1, 6:1 or 8:1), the adsorption temperature is 25 to 50 °C. (e.g., 40 to 50 °C, 50 °C, 40 °C), and the adsorption time is 10 to 30 min (e.g. 0.5 h, 20 min or 10 min);

preferably, the desorption solution is a sodium hydroxide solution with a concentration of 1-2 mol/L (e.g., 1.5 mol/L, 1 mol/L), the volume ratio of the desorption solution to the blotting resin is (5-10):1 (e.g., 5:1, 6:1 or 8:1), the desorption temperature is 25-50 °C. (e.g., 40-50 °C, 50 °C, 40 °C), and the desorption time is 30-120 min (such as 30-50 min, 50 min, 30 min).

In the present invention, the action principle of step (4) is as follows. The first leaching solution is selectively adsorbed and separated by the imprinting resin, and the functional group on the resin selectively adsorbs $ReO_4^-$, and the exchanged tail solution is sodium meta-aluminate solution, and the resin is desorbed to obtain sodium perrhenate solution. The desorbed resin can be recycled.

In the above method for preparing modified platinum-based catalyst for fuel cells by regeneration of platinum rhenium spent catalyst, in step (5), the acidic reagent is hydrochloric acid;

the aqueous solution of the acidic reagent has a concentration of 0.1 to 0.5 mol/L, specifically 0.2 mol/L, 0.1 mol/L, 0.3 mol/L or 0.5 mol/L;

A ratio of the mass of the first leaching residue to the volume of the aqueous solution of the acidic reagent is 1 g:(1 to 5) mL, such as 1 g: 1 mL or 1 g: 2 mL;

the oxidizing reagent is hydrogen peroxide;

the aqueous solution of the oxidizing reagent has a concentration of 10 to 30% by volume, specifically 10% to 20%, 20%, 10%, 15% or 18%;

a ratio of the mass of the first leaching residue to the volume of the aqueous solution of the oxidizing reagent is 1 g:(0.5 to 1) mL, such as 1 g: 0.5 mL, 1 g: 1 mL or 1 g: 0.8 mL;

the oxidation acid leaching is carried out at a temperature of 25 to 50 °C. (e.g., 50 °C) for a time of 0.5 to 2 h (e.g., 1 h, 0.5 h);

the precursors containing platinum and rhenium elements are chloroplatinic acid and perrhenic acid.

In the present invention, step (5) works as follows. The first leaching residue is subjected to oxidative acid leaching ($HCl+H_2O_2$) to generate a mixed solution of chloroplatinic acid and perrhenic acid, which is able to be used as a precursor solution for the preparation of modified platinum-based catalyst.

In the above method for preparing modified platinum-based catalyst for fuel cells by regeneration of platinum rhenium spent catalyst, in step (6), the step of reducing and loading the precursors containing platinum and rhenium elements in the second leaching solution onto a carbon carrier is as follows: dispersing the carbon carrier in an alkaline ethylene glycol solution, adding the second leaching solution, perform a reduction reaction with microwave assistance, acidifying the reaction product in turn, washing and drying to obtain the modified platinum-based catalyst for fuel cell;

the carbon carrier is carbon black, graphene or carbon nanotubes;

the ethylene glycol alkaline solution has a pH of 11 to 12 (e.g., 11 or 12) and the alkaline reagent is a sodium hydroxide solution;

a volume ratio of the ethylene glycol alkaline solution and the second leaching solution is (2 to 11):25, such as (5 to 8):25, 5:25 or 8:25;

the microwave has a power of 800 to 1200 W (e.g., 800 W, 900 W, 1000 W, 1100 W or 1200 W) at atmospheric pressure;

the reduction reaction is carried out at a temperature of 140 to 190 °C. (e.g., 170 to 190 °C, 170 °C, 180 °C or 190 °C) for a time of 2 to 3 min (e.g., 2 min or 3 min);

the pH in the acidifying step is adjusted from 2 to 3 (e.g., pH=2);

in the acidifying step, dilute hydrochloric acid, dilute sulfuric acid or dilute nitric acid is used;

the stabilization time in the acidifying step is 12 to 36 h, such as 12 h, 18 h or 36 h.

In the present invention, step (6) is a synthesis process of modified Pt/C catalyst, and works as follows. First, the carbon carrier is dispersed into an ethylene glycol alkaline solution, and a leaching solution containing dilute noble metals is added to it. Ethylene glycol can be decomposed into an intermediate substance with certain reducing properties such as glyoxal at high temperature, and this substance can reduce the general precious metal (e.g., Pt) precursors to metal elementary substance. In addition, glyoxal is converted into a glyoxylate substance adsorbed on the metal surface as the reaction proceeds, and under weak alkaline conditions, the metal particles repel each other, thus preventing the growth of metal particles and obtaining nanoparticles with small particle size. The reaction product obtained in step (6) is acidified and stabilized at pH 2 using dilute sulfuric acid, which is able to break the colloidal environment generated by the alkaline medium coordination in the previous step, followed by washing and drying, and then the modified platinum-based catalyst for fuel cells is synthesized.

In the above method for preparing modified platinum-based catalyst for fuel cells by regeneration of platinum rhenium spent catalyst, the loading of Pt in the modified platinum-based catalyst for fuel cells is from 5 to 30% (e.g., 19%, 17%, 20%, 21%, 18%, 22.3%) and the loading of Re is from 0.5 to 1.5% (e.g., 0.5%, 0.93%, 1.12%, 1.02%, 0.89%, 1.35%, 0.97%).

The present invention further provides a modified platinum-based catalyst for fuel cells obtained by the preparation method described in any one of the above.

A hydrogen fuel cells comprising the modified platinum-based catalyst is also within the scope of protection of the present invention.

The present invention provides a method for preparing modified platinum-based catalyst for fuel cell by regeneration of platinum rhenium spent catalyst, which has the following advantages.

1) The method for preparing modified platinum-based catalyst for fuel cells by regeneration of platinum rhenium spent catalyst provided by the present invention is simple in operation and short in process, and the prepared catalyst has high stability and good electrochemical properties.

(2) The method for preparing modified platinum-based catalyst for fuel cells by regeneration of platinum rhenium spent catalyst provided by the present invention can achieve the recovery of Re and Al group elements in the spent catalyst, high purity of the recovered products and high value utilization of Pt in the spent catalyst.

(3) The by-products of the method for preparing modified platinum-based catalyst for fuel cells by regeneration of platinum rhenium spent catalyst provided by the present invention are sodium meta-aluminate and sodium perrhenate. The by-product sodium perrhenate solution can be used as a precursor for the preparation of aluminum based petrochemical catalyst carriers, and mesoporous alumina carriers with high specific surface area can be prepared by precipitation method to achieve the regeneration and utilization of the carriers. The by-product sodium perrhenate solution can be used as the active component in the regenerated catalyst, and the active metal can be loaded on the catalyst carrier by impregnation reduction to realize the regeneration of sodium perrhenate.

SPECIFIC EMBODIMENTS

For a clearer understanding of the purpose, technical solutions and advantages of the present invention, a method for preparing modified platinum-based catalyst for fuel cells by regeneration of platinum rhenium spent catalyst of the present invention is described in further detail below in conjunction with the accompanying drawings and embodiments, but the protection of the present invention is not limited to the following description, and the embodiments are given for the sole purpose of clarifying the invention and are not intended to limit the scope of the invention. The following embodiments are provided as a guide for further improvements by those of ordinary skill in the art and do not in any way constitute a limitation to the present invention.

Equations in the following embodiments are as follows:

(1) Oil Removal Rate $$\alpha = \frac{C_0 - C_i}{C_0} \times 100\%$$

In this equation, $\alpha$ is the removal rate of spent catalyst oil, %; $C_0$ is the initial oil content of spent catalyst, g/100 g; $C_i$ is the oil content of catalyst after oil removal treatment, g/100 g. Among them, the initial oil content of spent catalyst and the oil content of spent catalyst after oil removal were extracted by solid-liquid extraction with a Soxhlet extractor (the extractant was $C_2Cl_4$) and quantified by infrared spectrophotometer.

(2) Leaching Rate $$x_i = \frac{C_i \times n \times V \times 10^{-6}}{w_i \times m} \times 100\%$$

In this equation, $x_i$ is the leaching rate of element, %; n is the sample dilution multiple; V is the volume of leaching filtrate, mL; $C_i$ is the concentration of each element tested by ICP, mg/L; m is the mass of the added raw material sample, g; wi is the mass percentage of each element in the raw material, %.

The experimental methods used in the following embodiments are conventional if no special instructions are given; the materials and reagents used are available from commercial sources if no special instructions are given.

Figure 1:
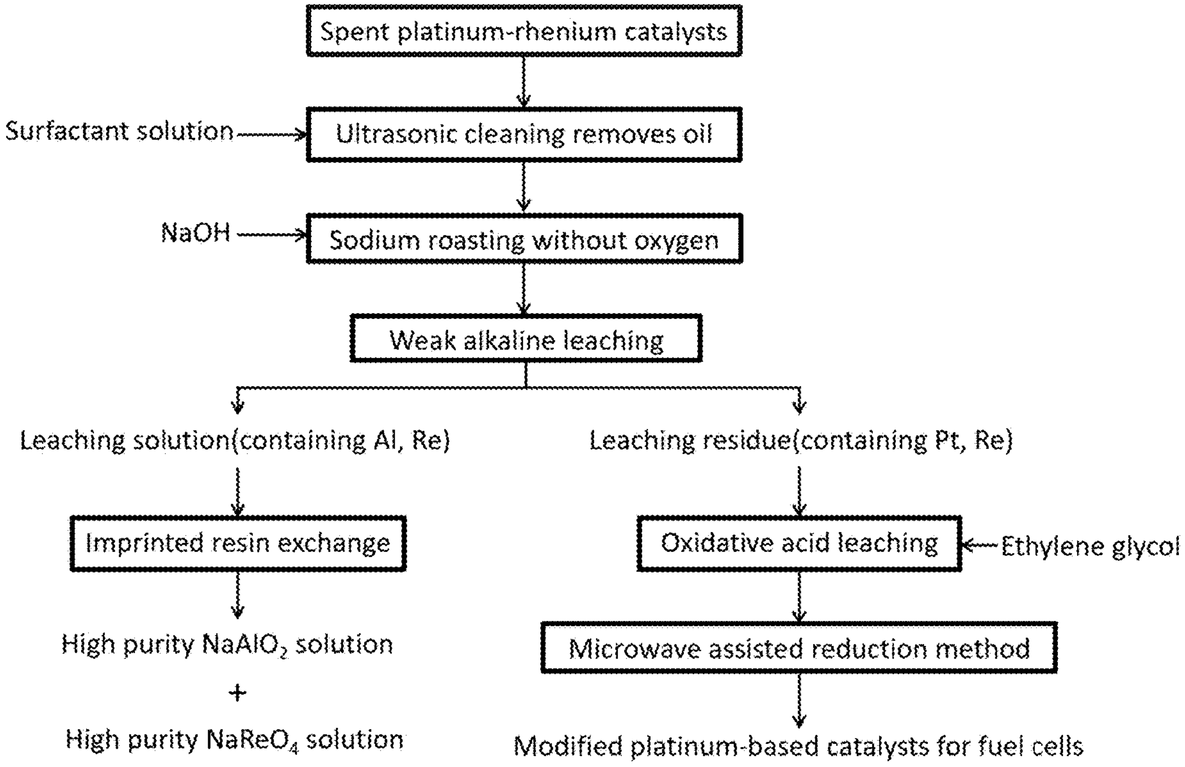
FIG. 1 shows the process flow diagram of the method for preparing modified platinum-based catalyst for fuel cells by regeneration of platinum rhenium spent catalyst in the embodiment of the present invention.

Example 1: Preparation of Modified Platinum-Based Catalyst for Fuel Cell by Regeneration of Platinum-Rhenium Spent Catalyst According to the flow chart shown in FIG. 1, the steps are as follows.

(1) 10 g of spent catalyst containing platinum rhenium (based on the catalyst mass, 95 wt % of alumina, 0.22 wt % of active metal component platinum, 0.43 wt % of active metal rhenium) were placed in a ball mill for ball milling, the speed was set at 500 r/min, ball milling time was set to 5 h, and after the ball milling, the sample was passed through 100 mesh sieve for next step use;

(2) The sample obtained in step (1) was added to 100 mL of a cleaning solution containing surfactants SDBS and AEO-3, in which the mass ratio of SDBS and AEO-3 solution was 1:1 and the concentration of SDBS and AEO-3 was 100 mg/L, placed in a water bath thermostatic shaker at 40 °C, the contact time was 1 h, and 200 W ultrasonic waves (occurring intermittently) were applied to it, and the spent catalyst powder was ultrasonically cleaned and de-oiled to obtain an oil-removed spent catalyst powder. The oil removal rate of the spent catalyst in this embodiment is 91.53%.

Figure 2:
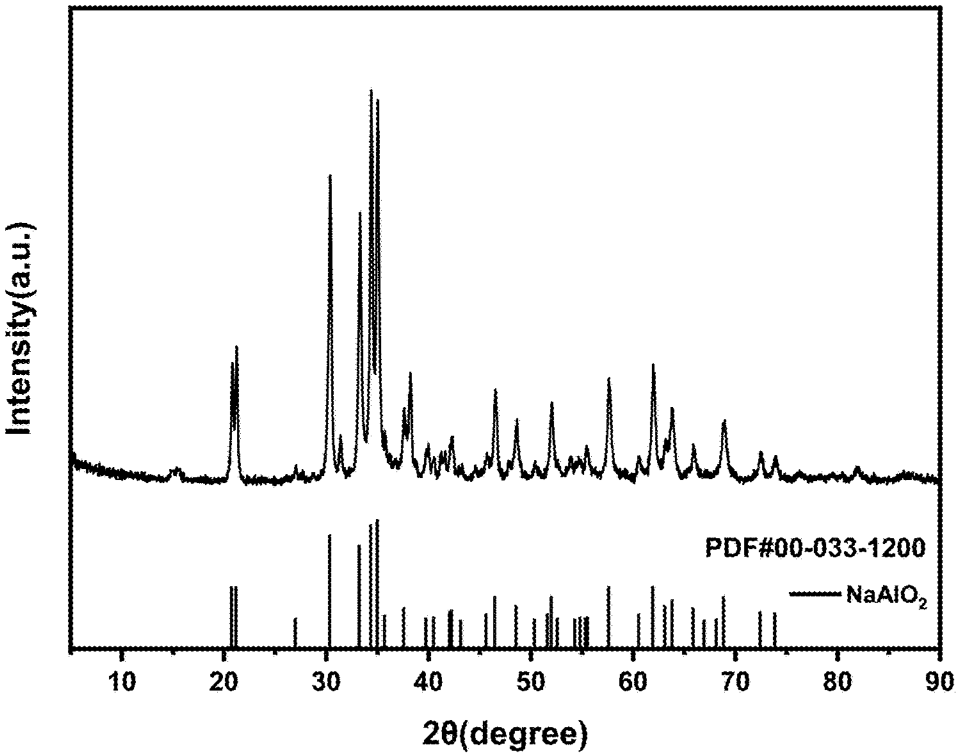
FIG. 2 shows the XRD characterization of the heat-treated clinker in step (3) of Example 1 of the present invention.

(3) The spent catalyst powder obtained from step (2) was dried and weighed to a mass of 9.13 g. 10.96 g of sodium hydroxide particles were weighed according to the mass ratio of spent catalyst to sodium hydroxide of 1:1.2 and ground in a mortar until they were well mixed. After mixing, the sample was transferred into a corundum crucible, placed in a tube furnace and protected by argon gas to create an oxygen-free environment, and heat-treated at a temperature of 500 °C for 2 h after 30 min of uniform ventilation. 17.72 g of a clinker was obtained after the reaction, which was mainly composed of sodium meta-aluminate, and the clinker was characterized in FIG. 2.

(4) The clinker obtained in step (3) was put into a 250 ml beaker and 180 mL of weakly alkaline aqueous solution was added, the weakly alkaline solution was prepared by sodium hydroxide, pH=8.5, and the solution was stirred magnetically in a water bath at 40 °C for 30 min. After the leaching, the sample was separated by high-speed centrifugation, the centrifuge speed was set at 10000 rpm/min and the centrifugation time was 10 min. The leaching solution containing Al and Re and the leach residue containing Pt and a small amount of Re were obtained. The leaching solution was diluted 10 times and 1000 times, respectively and the leaching rates of elemental Re and elemental Al in the leaching solution were measured by ICP-OES. The test results showed that the leaching rate of Re was 93.52% and the leaching rate of Al was 98.12%.

(5) The leaching solution in step (4) was passed into an exchange column equipped with imprinting resin, which is a polystyrene-based imprinting resin, manufacturer Boer Chemical Reagent (Boer), model: cross-linked 1% DVB (100-200 mesh). The volume ratio of the resin to the leaching solution was 1:10, the adsorption temperature was 50 °C, the adsorption time was 30 min, and the exchange tailing solution was sodium meta-aluminate solution. After the adsorption was finished, 90 mL of sodium hydroxide solution with a concentration of 1.5 mol/L was passed into the resin for desorption according to the desorption solution to resin volume ratio of 5:1, the desorption time was 50 min, the desorption temperature was the same as the adsorption temperature, and the sodium perrhenate solution was obtained.

(6) To the leaching residue obtained in step (4) was added 1 mL of hydrochloric acid solution with a concentration of 0.1 mol/L and 0.5 mL of $H_2O_2$ solution with a concentration of 10 vol %. In this example, the solid-liquid ratio of the leaching residue and the hydrochloric acid solution is 1:1 g/mL, the solid-liquid ratio of the leaching residue and the hydrogen peroxide solution is 1:0.5 g/mL, with a reaction time of 1 h and a reaction temperature of 50 °C, to obtain a leaching solution containing chloroplatinic acid and perrhenic acid.

(7) Carbon black was dispersed into an ethylene glycol alkaline solution, the alkaline solution being sodium hydroxide solution with the pH of 12. To the resulting mixture was added the leaching solution obtained from step (6). The amount of carbon black in this example is 80 mg, the alkaline ethylene glycol solution is 5 mL, the volume of the leaching solution is 25 mL. The reaction is carried out under the assistance of microwave with a microwave power of 900 W, a reaction temperature of 170 °C, and a reaction time of 2 min.

Figure 3:
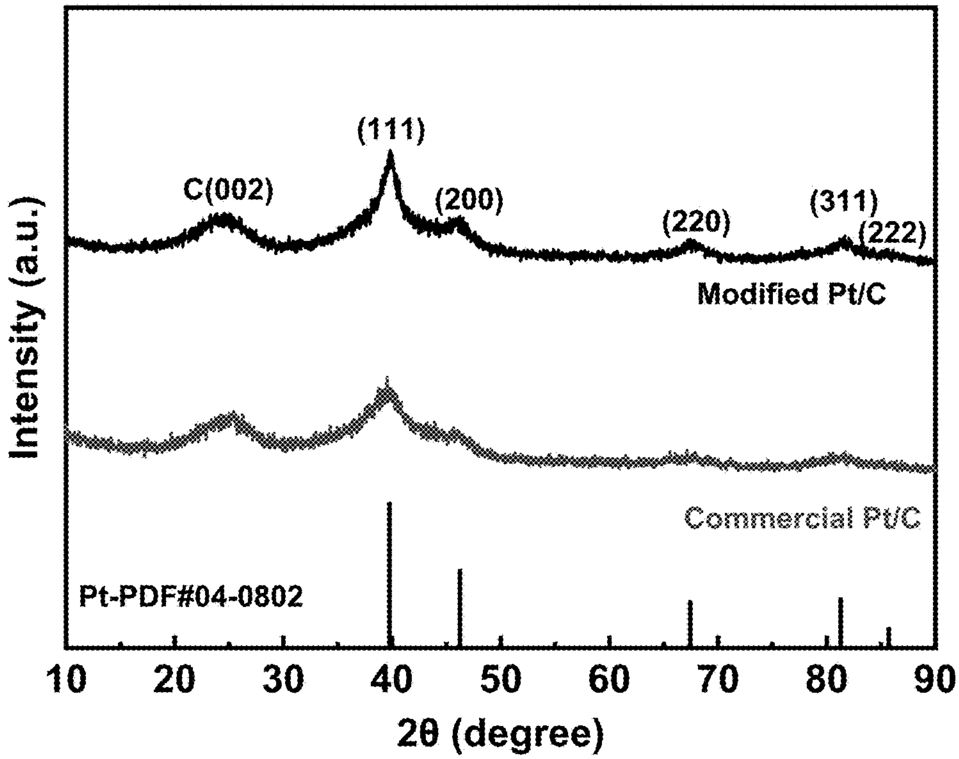
FIG. 3 shows the XRD characterization of the synthesized modified platinum-based catalyst in step (8) of Example 1 of the present invention.

(8) The reaction product obtained from step (7) was added with 0.5 mol/L $H_2SO_4$ solution to adjust the pH-2 and stabilized for 12 h, then washed and dried to obtain a modified platinum-based catalysts for fuel cell by regeneration. The XRD characterization of this catalyst is shown in FIG. 3.

Figure 4:
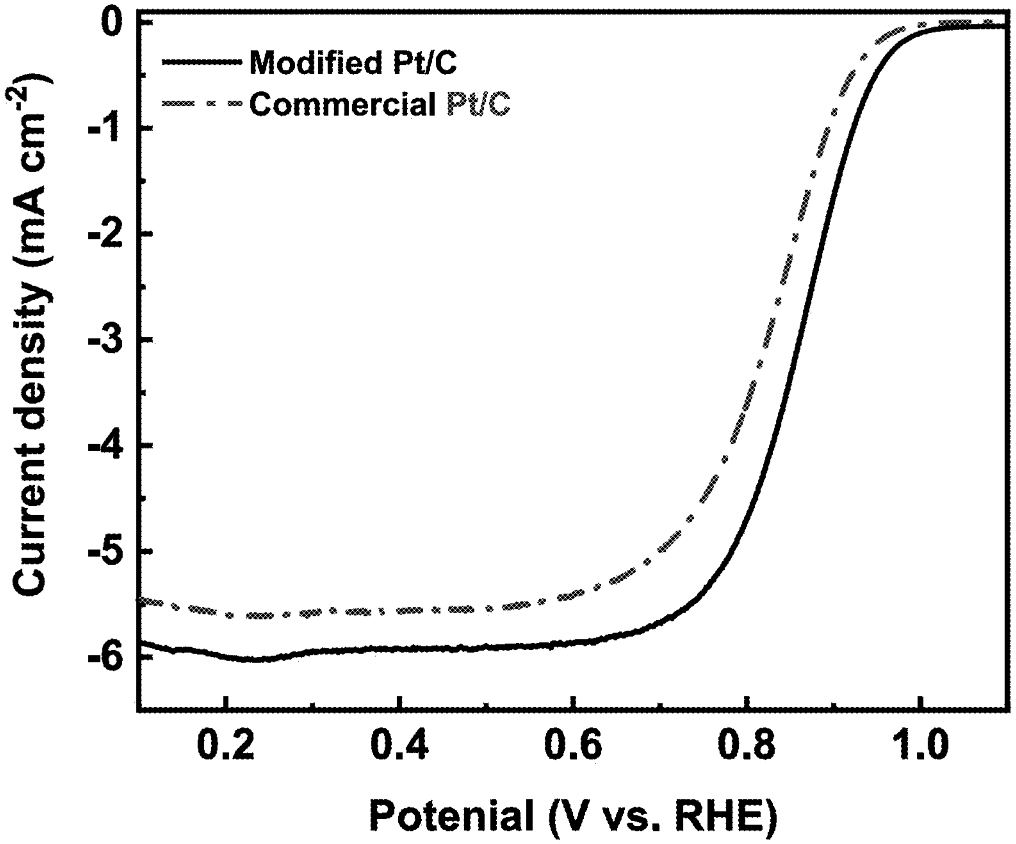
FIG. 4 shows the electrochemical performance test of the synthesized modified platinum-based catalyst in step (8) of Example 1 of the present invention.

The results of the active metal Pt and Re loading and electrochemical performance tests in the regenerated catalyst prepared in this example are shown in Table 1. The sample was dissolved and tested by ICP-OES, the loading of Pt could reach 19 wt % and the loading of Re could reach 0.5 wt %, and the rare metals obtained by the recovery were better loaded on the active sites of the carbon black carrier. The regenerated prepared modified catalyst was subjected to electrochemical performance tests. The electrochemical performance testing performed in this example was done on a rotating disc electrode and an electrochemical workstation. The working electrode was a glassy carbon electrode, the reference electrode was an $Hg/HgSO_4$ electrode, and the counter electrode was graphite. The electrolyte solution was 0.1 M perchloric acid (under an oxygen saturation condition) and the test method was linear scanning voltammetry, which was done at room temperature and atmosphere pressure. The half-wave potential of the catalyst prepared in this example was tested to be 0.86 V, which is a better performance compared to commercial Pt/C catalysts (commercial Pt/C catalysts with 20 wt % Pt loading correspond to a half-wave potential of 0.83 V), and the half-wave potential test procedure is shown in FIG. 4.

Example 2: Preparation of Modified Platinum-Based Catalyst for Fuel Cell by Regeneration of Platinum-Rhenium Spent Catalyst It was prepared according to the flow chart shown in FIG. 1, and the specific steps were as follows.

(1) 10 g of a spent catalyst (95.8 wt % alumina, active metal component platinum 0.24 wt %, active metal component rhenium 0.45 wt %, based on the catalyst mass) was placed in a ball mill for ball milling, the speed was set at 500 r/min and the ball milling time was set at 5 h. After the ball milling, the sample was passing through 100 mesh sieve for next step use;

(2) The sample obtained in step (1) was added to 200 mL of a cleaning solution containing surfactants SLS and TX-100, the mass ratio of SLS and TX-100 solution being 1:3, the concentration of SLS and TX-100 being 400 mg/L, placed in a water bath thermostatic shaker at 50 °C, the contact time was 2 h, and 300 W ultrasonic waves (occurring intermittently) were applied to it, and the spent catalyst powder was cleaned and de-oiled by ultrasound to obtain an oil-removed spent catalyst powder. The oil removal rate of the spent catalyst in this example was 95.32%.

(3) The spent catalyst powder obtained from step (2) was dried and weighed to a mass of 9.06 g. 12.68 g of sodium hydroxide particles were weighed according to the mass ratio of the spent catalyst to sodium hydroxide of 1:1.4 and ground in a mortar until they were well mixed. After mixing, the sample was transferred into a corundum crucible, placed in a tube furnace and protected by argon gas to create an oxygen-free environment, and heat-treated at 600 °C for 1 h after 30 min of continuous uniform ventilation. 18.55 g of a clinker was obtained after the reaction.

(4) The clinker obtained in step (3) was put into a 250 ml beaker and 190 mL of weakly alkaline aqueous solution was added to it. The weakly alkaline solution was prepared with sodium carbonate, pH=8.0, and the solution was stirred magnetically in a water bath at 40 °C for 40 min. After the leaching was finished, the sample was separated by high-speed centrifugation, the centrifuge speed was set at 10000 rpm/min and the centrifugation time was 10 min to obtain a leaching solution containing Al and Re and a leach residue containing Pt and a small amount of Re. The leaching solution was diluted 10 times and 1000 times respectively, and the leaching rates of element Re and element Al in the leaching solution were detected by ICP-OES. The test results showed that the leaching rate of Re was 96.20% and the leaching rate of Al was 99.82%.

(5) The leaching solution in step (4) was passed into an exchange column equipped with blotting resin, which was a polystyrene-based blotting resin, purchased from the same vendor and model as in Example 1, with the volume ratio of the resin to the leaching solution of 1:6, the adsorption temperature of 40 °C, and the adsorption time of 20 min, and the exchange tailing solution was sodium meta-aluminate solution. The desorption time was 30 min, and the desorption temperature was the same as the adsorption temperature, and the sodium perrhenate solution was obtained.

(6) The leaching residue obtained in step (4) was added to 1 mL of hydrochloric acid solution with a concentration of 0.3 mol/L and 1 mL of $H_2O_2$ solution with a concentration of 15 vol %. This example was added in accordance with the solid-liquid ratio of 1:1 g/mL for leaching residue and hydrochloric acid solution and 1:1 g/mL for leaching residue and hydrogen peroxide solution, with a reaction time of 1 h and a reaction temperature of 50 °C, to obtain a leaching solution containing chloroplatinic acid and perrhenic acid.

(7) Carbon black was dispersed into an ethylene glycol alkaline solution, the alkaline solution is sodium hydroxide solution with the pH of 12, and added with the leaching solution obtained from step (6). The amount of carbon black in this example was 80 mg, the ethylene glycol alkaline solution was 5 mL, the leaching solution volume was 25 mL, the reaction was under microwave assistance with microwave power of 1000 W, the reaction temperature was 180 °C, and the reaction time was 2 min.

(8) The reaction product obtained from step (7) was added with 0.5 mol/L $HNO_3$ solution to adjust the pH=2 and stabilized for 18 h, then dried after washing to obtain a modified platinum-based catalyst for fuel cells by regeneration.

The results of active metal Pt and Re loading and electrochemical performance tests in the regenerated catalyst prepared in this example are shown in Table 1. After the sample was dissolved and tested by ICP-OES, the loading of Pt was up to 16 wt % and the loading of Re was up to 0.43 wt %, and the loading of the rare metals on the carbon black carrier obtained by recycling was reduced. The regenerated modified catalyst was tested for electrochemical performance (the test system and conditions were the same as in Example 1), and the half-wave potential of the catalyst prepared in this example was tested to be 0.82 V, which was slightly inferior to that of the commercial Pt/C catalyst (the Pt loading and corresponding half-wave potential of the commercial Pt/C catalyst were the same as in Example 1).

Example 3: Preparation of Modified Platinum-Based Catalyst for Fuel Cell by Regeneration of Platinum-Rhenium Spent Catalyst It was prepared according to the flow chart shown in FIG. 1, and the specific steps were as follows.

(1) 10 g of a spent catalyst (97 wt % alumina, 0.25 wt % active metal component platinum, 0.43 wt % active metal component rhenium, based on the catalyst mass) was placed in a ball mill for ball milling, the speed was set at 500 r/min and the ball milling time was set at 5 h. After the ball milling, the sample was passing through 100 mesh sieve for next step use;

(2) The sample obtained in step (1) was added to 300 mL of a cleaning solution containing surfactants AES and AEO-3, the mass ratio of AES and AEO-3 solution being 1:4, the concentration of AES and AEO-3 being 500 mg/L, placed in a water bath thermostatic shaker at 40 °C, the contact time was 4 h, and 500 W ultrasonic waves (intermittent occurrence) were applied to it to ultrasonically clean and remove oil from the spent catalyst powder, to obtain an oil removed spent catalyst powder. The oil removal rate of the spent catalyst powder in this example was 96.95%.

(3) The spent catalyst powder obtained from step (2) was dried and weighed to a mass of 8.89 g. 8.89 g of sodium hydroxide particles were weighed in a 1:1 ratio of spent catalyst to sodium hydroxide and ground in a mortar and pestle until they were well mixed. After mixing, the sample was transferred into a corundum crucible, placed in a tube furnace and protected by argon gas to create an oxygen-free environment, and heat-treated at a temperature of 500 °C for 3 h after 30 min of continuous uniform ventilation. 16.95 g of a clinker was obtained after the reaction.

(4) The clinker obtained in step (3) was put into a 250 ml beaker and 170 mL of weakly alkaline aqueous solution was added to it. The weakly alkaline solution was prepared with sodium bicarbonate, pH=7.5, and the solution was stirred magnetically in a water bath at 50 °C for 20 min. After the leaching was finished, the sample was separated by high speed centrifugation, the centrifuge speed was set at 10000 rpm/min and the centrifugation time was 10 min. A leaching solution containing Al and Re and a leach residue containing Pt and a small amount of Re were obtained. The leaching solution was diluted 10 times and 1000 times. Leaching rates of element Re and element Al in the leaching solution were measured by ICP-OES. The test results showed that the leaching rate of Re was 93.50% and the leaching rate of Al was 97.38%.

(5) The leaching solution in step (4) was passed into an exchange column equipped with blotting resin, which was a polystyrene-based blotting resin, purchased from the same vendor and model as in Example 1, with the volume ratio of the resin to the leaching solution of 1:8, the adsorption temperature of 50 °C, and the adsorption time of 10 min, and the exchange tailing solution was sodium meta-aluminate solution. The desorption time was 30 min, and the desorption temperature was the same as the adsorption temperature, and the sodium perrhenate solution was obtained.

(6) The leaching residue obtained in step (4) was added to 2 mL of hydrochloric acid solution with a concentration of 0.1 mol/L and 0.8 mL of $H_2O_2$ solution with a concentration of 18 vol %. In this example, the solid-liquid ratio of leaching residue and hydrochloric acid solution was 1:2 g/mL, and the ratio of leaching residue and hydrogen peroxide solution was 1:0.8 g/mL, the reaction time was 0.5 h, the reaction temperature was 50 °C. A leaching solution containing chloroplatinic acid and perrhenic acid was obtained.

(7) Carbon black was dispersing into an ethylene glycol alkaline solution, the alkaline solution was sodium hydroxide solution, the pH of the solution was 11. To the resulting mixture was added the leaching solution obtained from step (6). The amount of carbon black in this example was 80 mg, the ethylene glycol alkaline solution was 8 mL, and the leaching solution volume was 25 mL. The reaction under the assistance of microwave, the microwave power was 800 W, the reaction temperature was 170 °C, and the reaction time was 3 min.

(8) The reaction product obtained from step (7) was added with 0.5 mol/L HCl solution to adjust the pH=2 and stabilized for 36 h, then washed and dried to obtain a modified platinum-based catalyst for fuel cells by regeneration.

The results of active metals Pt and Re loading and electrochemical performance tests in the regenerated catalyst prepared in this example are shown in Table 1. After the sample was dissolved and tested by ICP-OES, the loading of Pt could reach 20 wt % and the loading of Re could reach 1.12 wt %. The loading of the rare metals on the carbon black carrier obtained by recycling was high and met the commercial test conditions. The regenerated modified catalyst was tested for electrochemical performance (the test system and conditions were the same as in Example 1), and the half-wave potential of the catalyst prepared in this example was tested to be 0.85 V. The electrochemical performance was better than that of the commercial Pt/C catalyst (the Pt loading and corresponding half-wave potential of the commercial Pt/C catalyst were the same as in Example 1).

Example 4

This example was similar to the method used in Example 1, except that in step (2), 300 mL of the sample containing surfactants AES and APG1214 were added, and the mass ratio of AES and APG1214 solution was 1:2 with a concentration of 600 mg/L. The oil removal rate of the spent catalyst in this example was 95.58%. In step (3), 14.61 g of sodium hydroxide pellets were weighed and ground in a mortar according to the mass ratio of 1:1.6 of the spent catalyst to sodium hydroxide until they were well mixed. The heat treatment temperature was 300 °C and the heat treatment time was 5 h. In step (4), 200 mL of weakly alkaline aqueous solution was added, and the weakly alkaline solution was prepared with sodium hydroxide, pH-8.5. After the leaching was completed, the leaching solution was diluted 10 and 1000 times, respectively, and the leaching rates of element Re and element Al in the leaching solution were measured by ICP-OES. The test results showed that the leaching rate of Re was 82.13% and the leaching rate of Al was 92.17%. In step (7) the microwave power was 800 W, the reaction temperature was 170 °C and the reaction time was 3 min.

The loading of rare precious metals and electrochemical half-wave potential test values in the modified catalyst for fuel cell by regeneration prepared by this example are shown in Table 1.

Example 5

This example is similar to the method used in Example 1, except that in step (2), 600 mL of cleaning solution containing surfactants SDBS and APG was added to the sample, and the mass ratio of SDBS to APG solution was 1:2 with a concentration of 800 mg/L. The oil removal rate of the spent catalyst in this example was 97.54%. In step (3), 12.53 g of sodium hydroxide pellets were weighed in a 1:1.4 mass ratio of spent catalyst to sodium hydroxide and ground in a mortar until they were well mixed. The heat treatment temperature was 600 °C and the heat treatment time was 2 h. In step (7), the microwave power was 1200 W, the temperature was 180 °C and the reaction time was 2 min.

The loading of rare precious metals and electrochemical half-wave potential test values in the modified catalysts for fuel cells by regeneration prepared in this example are shown in Table 1.

Example 6

This example was similar to the method used in Example 1, except that in step (2), 500 mL of cleaning solution containing surfactants SLS and AEO-3 was added to the sample, and the mass ratio of SLS and AEO-3 solution was 1:2 with a concentration of 900 mg/L. The oil removal rate of the spent catalyst in this example was 93.87%. In step (3), 9.12 g of sodium hydroxide particles were weighed in a 1:1 mass ratio of spent catalyst to sodium hydroxide and ground in a mortar until they were well mixed. The heat treatment temperature was 400 °C and the heat treatment time was 3 h. In step (7), the microwave power was 1100 W and the reaction time was 3 min.

The loading of rare precious metals and the electrochemical half-wave potential test values in the modified catalyst for fuel cell by regeneration prepared in this example are shown in Table 1.

Example 7

This example is similar to the method used in Example 1, except that in step (2), 400 mL of a cleaning solution containing surfactants AES and TX-100 was added to the sample, and the mass ratio of AES and TX-100 solution was 1:1, and the concentration was 500 mg/L. The oil removal rate of the spent catalyst in this example was 94.63%. In step (3), 11.0 g of sodium hydroxide pellets were weighed in a 1:1.2 mass ratio of spent catalyst to sodium hydroxide and ground in a mortar until fully mixed. The heat treatment temperature was 500 °C and the heat treatment time was 1 h. In step (7), the microwave power was 1000 W, the reaction temperature was 190 °C and the reaction time was 2 min.

The loading of rare precious metals and electrochemical half-wave potential test values in the modified catalysts for fuel cells by regeneration prepared in this example are shown in Table 1.

Comparative Example 1

This comparative example was similar to the method used in Example 1, with the difference that no surfactant was added to the cleaning solution in step (2), and the oil removal rate was 8.6%. Because no surfactant was added, the surface of the spent catalyst contained more residual oil, which would affect the reaction process of the heat treatment part and reduce the recovery of valuable metals as well as the loading rate of rare metals and the electrochemical performance of the catalyst. The values of dilute noble metal loading and electrochemical half-wave potential tests in the modified catalysts for regenerative fuel cells prepared in this comparative example are shown in Table 1.

Comparative Example 2

This comparative example was similar to the method used in Example 1, with the difference that ultrasonic waves during the oil removal process of the spent catalyst powder was not used in step (2), the oil removal rate was 86.58%.

Because of not using ultrasonic waves, the residual oil removal rate on the surface of the spent catalyst was not high, which would affect the reaction process of the heat treatment part and reduce the recovery rate of valuable metals as well as the loading rate of rare metals and the electrochemical performance of the catalyst. The values of dilute noble metal loading and electrochemical half-wave potential tests in the modified catalysts for regenerative fuel cells prepared in this comparative example are shown in Table 1.

Comparative Example 3

This comparative example was similar to the method used in Example 1, except that only surfactant SDBS was added to the cleaning solution in step (2), and the oil removal rate was 74.23%. The loading of rare precious metals and the electrochemical half-wave potential test values in the modified catalyst for fuel cells by regeneration prepared in this comparative example are shown in Table 1.

Comparative Example 4

This comparative example was similar to the method used in Example 1, except that only surfactant AEO was added to the cleaning solution in step (2), and the oil removal rate was 67.52%. The loading of rare precious metals and the electrochemical half-wave potential test values in the modified catalyst for regenerative fuel cells prepared in this comparative example are shown in Table 1.

Comparative Example 5

The comparative example was similar to the method used in Example 1, except that the sodium heat treatment process in step (3) was not protected by inert atmosphere of argon gas. The oxidation process produced volatile oxides due to the exposure of the rare precious metal rhenium to air. The recovery of rhenium metal further decreases, while the prepared regenerated catalyst has a lower loading of rhenium and the electrocatalytic activity of the catalyst is reduced. The loading of dilute noble metals and the electrochemical half-wave potential test values in the modified catalysts for regenerated fuel cells prepared in this comparative example are shown in Table 1.

Comparative Example 6

This comparative example was similar to the method used in Example 1, with the difference that the heat treatment temperature of oxygen-free sodization in step (3) was 600 °C. Increasing the heat treatment temperature facilitates the reaction process. The loading of rare precious metals and the electrochemical half-wave potential test values in the modified catalyst for fuel cell by regeneration prepared in this comparative example are shown in Table 1.

Comparative Example 7

The comparative example was similar to the method used in Example 1, with the difference that the oxidant hydrogen peroxide was not added in step (6). Without the oxidant, it is difficult to dissolve the dilute noble metals, making the regenerated prepared catalysts with low loading and poor electrocatalytic activity. The loading of rare precious metals and the electrochemical half-wave potential test values in the modified catalyst for fuel cell by regeneration prepared in this comparative example are shown in Table 1.

Comparative Example 8

The method used in this comparative example was similar to that used in Example 1, except that the power set in the microwave assisted process in step (7) is 1100 W. Increasing the power of the reaction process results in a more complete reaction, a full reaction of the synthesized catalyst, a larger loading, and good catalytic activity. The loading of rare precious metals and the electrochemical half-wave potential test values in the modified catalyst for fuel cell by regeneration prepared by this comparative example are shown in Table 1.

Comparative Example 9

This comparative example was similar to the method used in Example 1, with the difference that the microwave-assisted reaction product was not acidified with sulfuric acid in step (8). Still retaining the alkaline environment can affect the coordination of Pt and reduce its electrochemical properties. The loading of rare precious metals and the electrochemical half-wave potential test values in the modified catalyst for fuel cells by regeneration prepared in this comparative example are shown in Table 1.

The active metal loading and electrochemical properties of the modified catalyst for fuel cell by regeneration obtained from the above examples were tested and the results were as follows.

TABLE 1

Active metal loading and electrochemical properties in the modified catalyst for fuel cell in the examples and in the comparative examples

| Sample No | Loading of active metal Pt | Loading of doped metal Re | Half-wave potential of regenerated catalyst |
|---|---|---|---|
| Example 1 | 19 wt % | 0.5 wt % | 0.86 V |
| Example 2 | 16 wt % | 0.43 wt % | 0.82 V |
| Example 3 | 20 wt % | 1.12 wt % | 0.85 V |
| Example 4 | 21 wt % | 1.02 wt % | 0.86 V |
| Example 5 | 18 wt % | 0.89 wt % | 0.84 V |
| Example 6 | 22.3 wt % | 1.35 wt % | 0.87 V |
| Example 7 | 17 wt % | 0.97 wt % | 0.85 V |
| Comparative Example 1 | 14 wt % | 0.63 wt % | 0.81 V |
| Comparative Example 2 | 16 wt % | 0.72 wt % | 0.81 V |
| Comparative Example 3 | 15.7 wt % | 0.53 wt % | 0.82 V |
| Comparative Example 4 | 15.2 wt % | 0.51 wt % | 0.81 V |
| Comparative Example 5 | 17.5 wt % | 0.35 wt % | 0.80 V |
| Comparative Example 6 | 19 wt % | 0.89 wt % | 0.80 V |
| Comparative Example 7 | 6 wt % | 0.1 wt % | 0.79 V |
| Comparative Example 8 | 21.7 wt % | 0.95 wt % | 0.87 V |
| Comparative Example 9 | 18.4 wt % | 0.73 wt % | 0.83 V |

From the above table, it can be seen that the modified Pt-based catalyst for fuel cell by regeneration prepared by this process can be loaded up to 22.3 wt % of active metal Pt and up to 1.35 wt % of Re, which can meet the normal use of the devices. The optimum half-wave potential is 0.87V by electrochemical test, which shows good electrochemical performance.

The above only illustrates several specific embodiments in the present invention, but it does not serve as the scope of protection of the present invention, and any equivalent changes or modifications or equal scaling up or down, etc. made according to the design spirit in the present invention shall be considered to fall into the scope of protection of the present invention.

The invention claimed is:

1. A method for preparing modified platinum-based catalyst for fuel cell by regeneration of platinum rhenium spent catalyst comprising the steps of:

(1) removing oil adhered to an aluminum-based platinum rhenium-containing spent catalyst to obtain a de-oiled spent catalyst;

(2) mixing the de-oiled spent catalyst treated in step (1) with sodium hydroxide powder followed by heat treating in an oxygen-free environment to obtain a clinker;

(3) leaching the clinker in a weakly alkaline aqueous solution to obtain a first leach solution containing the elements Al and Re and a first leach residue containing Pt and a small portion of Re;

(4) converting the first leaching solution into a sodium meta-aluminate solution and a sodium perrhenate solution;

(5) adding an aqueous solution of an acidic reagent and an aqueous solution of an oxidizing reagent to the first leaching residue for oxidative acid leaching to obtain a second leaching solution containing precursors comprising platinum and rhenium elements;

(6) reducing and loading the precursors containing platinum and rhenium elements in the second leaching solution on a carbon carrier to obtain a rhenium-doped Pt/C catalyst to obtain the modified platinum-based catalyst for fuel cell.

2. The method for preparing modified platinum-based catalyst for fuel cell by regeneration of platinum rhenium spent catalyst according to claim 1, wherein a mass percent content of alumina in the platinum-rhenium-containing spent catalysts is 95 to 97%;

a mass percent content of the active metal component platinum in the platinum-rhenium-containing spent catalyst is 0.2 to 0.3%;

a mass percent content of the active metal component rhenium in the platinum-rhenium-containing spent catalyst is 0.4 to 0.5%;

in step (1), the step of removing oil in step (1) is as follows: grinding the platinum-rhenium containing spent catalyst to obtain a powdered platinum-rhenium spent catalyst, adding a complex surfactant solution to the powdered platinum-rhenium spent catalyst for cleaning under an ultrasonic condition to obtain the de-oiled spent catalyst;

the powdered platinum rhenium spent catalyst has a particle size of 100 to 200 mesh;

the compound surfactant is comprised by a nonionic surfactant and an anionic surfactant;

the nonionic surfactant is selected from any one of fatty alcohol polyoxyethylene ether, TX-100, and glucoside;

the anionic surfactant is selected from any one of sodium dodecyl benzene sulfonate, sodium fatty alcohol ethoxylate sulfate, and sodium dodecyl sulfonate;

a mass ratio of the nonionic surfactant to the anionic surfactant is (1 to 4):1;

the compound surfactant solution has a concentration of 100 to 1000 mg/L;

a ratio of the mass of the platinum-rhenium containing spent catalyst to the volume of the aqueous surfactant solution is 1 g:(10 to 100) mL; and the ultrasonic condition has a power of 100 to 500 W, a cleaning temperature of 25 to 60 °C and a cleaning time of 1 to 4 h.

3. The method for preparing modified platinum-based catalyst for fuel cell by regeneration of platinum rhenium spent catalyst according to claim 1, wherein in step (2), the mass ratio of the spent catalyst treated by step (1) to the sodium hydroxide powder is 1:(0.8 to 1.6);

the oxygen-free environment is under an inert gas protection;

the heat treatment is at a temperature in range from 300 to 600 °C and a time in range from 1 to 5 h.

4. The method for preparing modified platinum-based catalyst for fuel cell by regeneration of platinum rhenium spent catalyst according to claim 1, wherein in step (3), the weakly alkaline aqueous solution has a pH value of 7.1 to 8.9;

the solute in the weakly alkaline aqueous solution is sodium hydroxide, sodium carbonate, or sodium bicarbonate;

a ratio of the mass of the clinker to the volume of the weakly alkaline aqueous solution is 1 g:(10 to 20) mL;

the leaching is carried out under a stirring condition, at a leaching temperature of 25-60 °C and a leaching time of 10-60 min.

5. The method for preparing modified platinum-based catalyst for fuel cell by regeneration of platinum rhenium spent catalyst according to claim 1, wherein in step (4), the step of converting the first leaching solution into a sodium meta-aluminate solution and a sodium perrhenate solution is as follows: passing the first leaching solution into an exchange column equipped with an imprinting resin capable of selectively adsorbing a rhenium-containing anion group, and collecting an exchange tail solution, to obtain the sodium meta-aluminate solution and, when the adsorption is finished, passing a desorption solution into the resin for desorption to obtain the sodium perrhenate solution;

the imprinting resin is an ion-imprinted resin containing a polystyrene group;

the volume ratio of the first leaching solution to the imprinting resin is (5 to 10):1, the adsorption temperature is 25 to 50 °C, and the adsorption time is 10 to 30 min;

the desorption solution is sodium hydroxide solution with a concentration of 1 to 2 mol/L, the volume ratio of the desorption solution to the imprinting resin is (5~10):1, the desorption temperature is 25 to 50 °C, and the desorption time is 30 to 120 min.

6. The method for preparing modified platinum-based catalyst for fuel cell by regeneration of platinum rhenium spent catalyst according to claim 1, wherein in step (5), the acidic reagent is hydrochloric acid;

the aqueous solution of the acidic reagent has a concentration of 0.1 to 0.5 mol/L;

a ratio of the mass of the first leaching residue to the volume of the aqueous solution of the acidic reagent is 1 g:(1 to 5) mL;

the oxidizing reagent is hydrogen peroxide;

the aqueous solution of the oxidizing reagent has a volume concentration of 10 to 30%;

a ratio of the mass of the first leaching residue to the volume of the aqueous solution of the oxidizing reagent is 1 g:(0.5 to 1) mL;

the oxidizing acid leaching is carried out at a temperature of 25 to 50 °C for a time of 0.5 to 2 h;

the precursors containing platinum and rhenium elements are chloroplatinic acid and perrhenic acid.

7. The method for preparing modified platinum-based catalyst for fuel cell by regeneration of platinum rhenium spent catalyst according to claim 1, wherein in step (6), the step of reducing and loading precursors containing platinum and rhenium elements in the second leaching solution on a carbon carrier comprises: dispersing the carbon carrier in an ethylene glycol alkaline solution, adding with the second leaching solution, and carrying out a reduction reaction under microwave assistance, acidifying, washing and drying the reaction product in turn to obtain the modified platinum-based catalyst for fuel cell;

the carbon carrier is carbon black, graphene, or carbon nanotubes;

the ethylene glycol alkaline solution has a pH of 11 to 12 and the alkaline reagent is a sodium hydroxide solution;

the ethylene glycol alkaline solution and the second leaching solution have a volume ratio of (2 to 11):25;

the microwave has a power of 800 to 1200 W at atmospheric pressure;

the reduction reaction is carried out at a temperature of 140 to 190 °C for a time of 2 to 3 min;

in the acidifying step, the pH value is adjusted to 2-3;

in the acidifying step, a dilute hydrochloric acid, a dilute sulfuric acid, or a dilute nitric acid is used; and in the acidifying step, a stabilization time is 12 to 36 h.

8. The method for preparing modified platinum-based catalyst for fuel cell by regeneration of platinum rhenium spent catalyst according to claim 1, wherein a loading of Pt is 5-30% and a loading of Re is 0.5-1.5%, in the modified platinum-based catalyst for fuel cell.

* * * * *